United States Patent Office 2,884,038
Patented Apr. 28, 1959

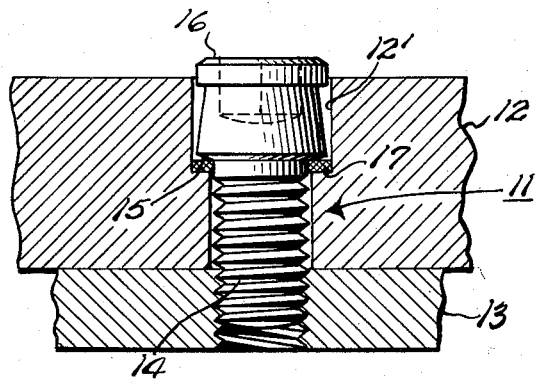
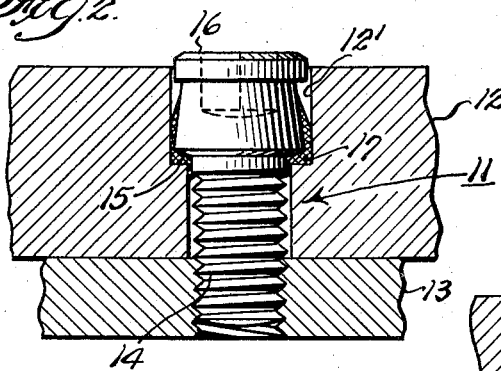
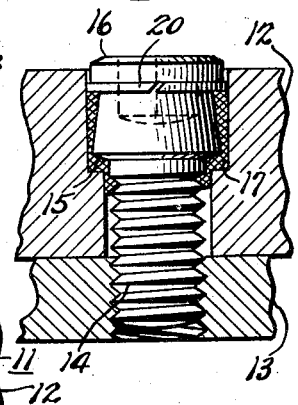
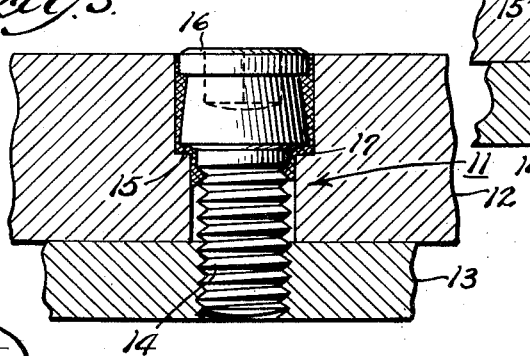
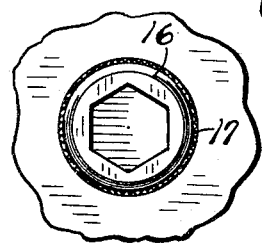
INVENTOR.
Albert E. Overton.

2,884,038

BOLT HEAD HAVING UNDERCUT PORTION TO RECEIVE FLOWABLE LEAD WASHER

Albert E. Overton, Park Ridge, Ill.; Clarence W. Payne and De Wayne M. Williams, executors of said Albert E. Overton, deceased Application January 19, 1955, Serial No. 482,720

3 Claims. (Cl. 151—44)

This invention relates to a self-locking screw apparatus, and it is an object of the invention to provide improved apparatus of that character.

It is a long-standing problem in the fastening art to provide a self-locking screw which is inexpensive to make and at the same time locks itself in position very securely. Preferably, a self-locking screw should be reusable when it is forcibly removed after being locked in position. Self-locking screw apparatus constructed in accordance with the present invention accomplishes all of these objectives.

Accordingly, it is another object of the invention to provide improved self-locking screw apparatus which may be firmly locked in position and which is reusable after forcible removal.

It is another object of the invention to provide improved self-locking screw apparatus which resists removal not only during the first few degrees of travel, but during several complete or 360° turns.

It is another object of the invention to provide improved self-locking screw apparatus which has one or more of the advantages recited above while being inexpensive to manufacture.

This invention, together with further objects and advantages thereof, will best be understood by reference to the following description taken in connection with the accompanying drawing, and its scope will be pointed out in the appended claims.

In the drawings, in which like parts are designated by like reference numerals,

Figs. 1, 2, and 3 are cross-sectional views of a screw and lead washer assembly in various stages of locking;

Fig. 4 is a view of the head end of the construction of Figs. 1, 2, and 3;

Fig. 5 is a partial view similar to Figs. 1, 2, and 3, but showing an alternative embodiment of the invention.

Self-locking screw apparatus constructed in accordance with the present invention is particularly desirable where it is to be subjected to vigorous and prolonged vibration because of the fact that it resists removal even after the screw has been loosened by rotation through several 360° turns. However, the apparatus is desirable in any application where a self-locking screw is needed.

In Fig. 1 a screw 11 is shown extending through a construction member 12 and threadedly engaging a second construction member 13. The generally cylindrical head of the screw 11 is received within a cylindrical opening in the member 12 defined by the cylindrical wall 12'. For the purpose of further reference, the screw includes a threaded portion 14, a shoulder 15, and a crown 16. Attention is directed to the fact that while the edges of the crown 16 are chamfered, as shown in the drawing, thereby giving it a "crowned" effect, this is of no consequence in the present invention, and where the word "crown" is employed herein, it is intended merely to refer to the upper or outer surface of the head of the bolt regardless of its contour.

Arranged below the shoulder 15 of the screw in Fig. 1 is a lead washer 17. In Fig. 2 the screw 11 is shown further tightened to compress the lead washer 17, the latter being caused to flow outwardly and upwardly into the narrow annular space between the head of the bolt and the cylindrical walls 12' of the construction member 12. In Fig. 3 the screw 11 has been tightened still further, causing the lead washer to flow further upwardly to fill the annular space between the bolt head and the construction member.

With the screw thus tightened, and with the lead washer thus caused to flow between the facing walls of the screw head and the construction member 12, the screw is firmly locked against rotation. In the simplest form of the invention the bolt head is purely cylindrical. The pressure of the lead which has been caused to flow between the bolt head and the surrounding construction firmly resists loosening of the screw. In the preferred embodiment of the invention, however, the generally cylindrical head of the screw is of a larger diameter adjacent the shoulder 15 and the crown 16 than it is at its intermediate portions. More particularly, the intermediate portions taper from the diameter at the shoulder 15 to a minimum diameter adjacent the crown 16, at which point the head expands abruptly to a larger diameter.

With this particular configuration of the head of the screw, it will be seen that an annular lead wedge is formed by the flowing of the lead washer. Removal of the screw is thus further restricted, particularly after initial loosening movement, since removal of the screw necessitates re-working of the lead as the enlarged diameter shoulder 15 is forced past the annular lead wedge.

The principal function of the greater head diameter adjacent the crown thereof is to restrict the flow of lead during the initial tightening of the screw, thus turning the flowing lead back downwardly and causing it to pile up and fill the annular opening. Without this particular feature, the lead tends to creep along the surface of the head, as suggested in Fig. 2.

In the alternative embodiment illustrated in Fig. 5, the bolt 11 may be identical to that shown in Figs. 1–4, but the assembly includes a ring 20 which further confines the flowing lead during the tightening of the screw. The ring 20 may be split, similar to a piston ring, whereby it may readily be forced over the enlarged diameter at the crown of the screw head and may resiliently engage the walls 12'. The ring 20 may be of metal, but it may also be of relatively inexpensive plastic.

It has already been pointed out that in the simplest embodiment of the invention the screw head 11 may be truly cylindrical. In the preferred embodiment of the invention illustrated in the drawing, the generally cylindrical walls of the screw head taper from a given diameter at the shoulder to a minimum diameter adjacent the crown. The purpose of this tapering is, as explained above, to provide a wedging action. Accordingly, it will be readily understood that the tapering of the screw head need not be uniform and need not extend over any particular portion of the height of the screw head. The essence of this preferred embodiment of the invention is that the screw head be tapered to provide a wedging action of the cold worked lead washer, and that a restriction be arranged adjacent the crown of the screw head to turn back the flowing lead so that it may fill the annular opening between the screw head and the surrounding construction.

The washer 17 is referred to above as being of lead. Normally a washer of substantially pure lead is both economical and mechanically satisfactory. However, it will be understood that the material of the washer may include substantial quantities of other metals and still classify as a lead washer. Alternatively, the washer employed in the present invention can be of any metal soft enough to flow to the desired extent under the available pressure.

It will now be seen that the present invention provides self-locking screw apparatus which is economical and in which the screw is firmly locked. Furthermore, especially with the preferred embodiment of the invention, the screw resists removal through several complete turns. The screw, in fact, strongly resists rotation as long as any substantial portion of the screw head remains within the construction member 12. Still further, the screw itself is reusable after being locked in place and forcibly removed.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. Self-locking threaded apparatus in combination with a body having an aperture therethrough said aperture having an enlarged circular outer portion whereby an annular shoulder is defined at the inner end of said enlarged portion, said apparatus comprising a threaded member having a threaded portion and a head portion having a substantially circular periphery, the ends of said head portion having an outer diameter substantially equal to but less than said enlarged circular outer portion of said aperture and the diameter of the portion of said head intermediate said ends being substantially less than the diameter of the enlarged portion of said aperture, and a washer formed of a material having the malleable and ductile qualities of lead initially disposed between said annular shoulder and one of said ends and re-formed under pressure between said annular shoulder and said one end to substantially fill the annular space defined by said enlarged outer portion of the aperture and the ends and reduced intermediate portions of said self-locking threaded apparatus, the axial length of said one end and said intermediate portion being less than the axial length of said enlarged outer portion, the axial length of said one end being relatively short whereby said annular space extends to a position adjacent said annular shoulder.

2. The self-locking threaded apparatus of claim 1 wherein said intermediate portion of said head is frusto-conical, having its largest diameter adjacent said one end.

3. The self-locking threaded apparatus of claim 2 wherein a resilient washer is disposed about said intermediate portions of said head adjacent the other of said ends, said washer having a diameter to substantially conform to the periphery of said enlarged outer portion of said aperture.

References Cited in the file of this patent

UNITED STATES PATENTS

| | | |
|---|---|---|
| 472,489 | Sweetland | Apr. 5, 1892 |
| 1,956,021 | Goddaire | Apr. 24, 1934 |
| 2,001,290 | Thomson | May 14, 1935 |
| 2,463,378 | Hallerstrom | Mar. 1, 1949 |

FOREIGN PATENTS

| | | |
|---|---|---|
| 1,315 | Great Britain | Jan. 21, 1901 |
| 608,067 | France | Apr. 10, 1926 |
| 483,177 | Germany | Oct. 3, 1928 |